(12) United States Patent
Ferrer Florit (10) Patent No.: US 11,038,748 B2
(45) Date of Patent: Jun. 15, 2021

(54) MULTI-LANE COMMUNICATION

(71) Applicant: STAR-DUNDEE LIMITED, Dundee (GB)

(72) Inventor: Albert Ferrer Florit, Barcelona (ES)

(73) Assignee: STAR-DUNDEE LIMITED, Dundee (GB)

( * ) Notice: Subject to any disclaimer, the term of this patent is extended or adjusted under 35 U.S.C. 154(b) by 511 days.

(21) Appl. No.: 16/073,475

(22) PCT Filed: Jan. 27, 2017

(86) PCT No.: PCT/GB2017/050207
§ 371 (c)(1),
(2) Date: Jul. 27, 2018

(87) PCT Pub. No.: WO2017/134419
PCT Pub. Date: Aug. 10, 2017

(65) Prior Publication Data
US 2021/0105180 A1    Apr. 8, 2021

(30) Foreign Application Priority Data

Feb. 1, 2016 (GB) ..................................... 1601802
Feb. 2, 2016 (GB) ..................................... 1601873

(51) Int. Cl.
*H04L 12/24* (2006.01)
*H04L 12/939* (2013.01)
*H04L 25/14* (2006.01)

(52) U.S. Cl.
CPC .......... *H04L 41/0803* (2013.01); *H04L 25/14* (2013.01); *H04L 49/555* (2013.01)

(58) Field of Classification Search
CPC ....... H04L 49/555; H04L 25/14; H04L 1/243; H04L 41/0803
See application file for complete search history.

(56) References Cited

U.S. PATENT DOCUMENTS

2008/0031312 A1\* 2/2008 Haas ....................... H04L 1/243
375/221
2009/0016383 A1\* 1/2009 Suzuki .................. H04L 49/555
370/509

(Continued)

OTHER PUBLICATIONS

International Search Report for PCT/GB2017/050207, Completed by the European Patent Office dated Apr. 3, 2017, 3 Pages.

(Continued)

*Primary Examiner* — Vinncelas Louis
(74) *Attorney, Agent, or Firm* — Brooks Kushman P.C.

(57) ABSTRACT

A multi-lane communication interface is provided for use in a link, such as SpaceFibre used on-board spacecraft. The interface has logic, when operating at a near end in cooperation with a far-end multi-lane communication interface, to: establish symbol synchronisation with the far-end over one or more lanes; send and receive data words to and from the far-end while maintaining the symbol synchronisation (A); detect a change in lane status; and upon detection of the change in lane status and while maintaining the symbol synchronisation: stop sending (B) data words; send (B) near-end lane-status control words to the far end instead of data words, until it is determined that the near end is ready to send data words, then resume sending (C) data words; and send (C) near-end lane-alignment signals to the far end, until a data word is received from the far end.

18 Claims, 6 Drawing Sheets

(56) References Cited

U.S. PATENT DOCUMENTS

2010/0329112 A1* 12/2010 Ahn .................. H04L 25/14
370/225
2012/0320737 A1 12/2012 Assarpour

OTHER PUBLICATIONS

Han et al. ETRI Journal Dec. 2014, vol. 36, No. 6, pp. 1066-1069, "Lane Adaptive Recovery for Multiple Lane Faults in Optical Ethernet Link".

* cited by examiner

MULTI-LANE COMMUNICATION

CROSS-REFERENCE TO RELATED APPLICATION

This application is the U.S. national phase of PCT Application No. PCT/GB2017/050207 filed on Jan. 27, 2017, which claims priority to GB Patent Application No. 1601802.0 filed on Feb. 1, 2016 and GB Patent Application No. 1601873.1 filed on Feb. 2, 2016, the disclosures of which are incorporated in their entirety by reference herein.

The present invention relates to multi-lane communication links. More particularly, the invention relates to multi-lane communication interfaces for use in a multi-lane communication link, multi-lane communication links themselves and associated methods of communication. The present invention may find application in the SpaceFibre communication link.

BACKGROUND ART

SpaceWire and SpaceFibre are data-handling networks for use on-board spacecraft. SpaceWire is established as one of the main data-handling protocols and is used on many ESA (European Space Agency), NASA (National Aeronautics and Space Administration) and JAXA (Japan Aerospace eXploration Agency) spacecraft. SpaceFibre is an emerging standard that provides a very high-speed serial data-link for high data-rate payloads, complementing the capabilities of the widely used SpaceWire.

SpaceFibre is a spacecraft on-board data link and network technology which runs over both copper and fibre optic cables. Initially targeted at very high data rate instruments like Synthetic Aperture Radar (SAR) and multi-spectral imaging instruments, SpaceFibre is capable of fulfilling a wider set of spacecraft on-board communications applications because of its inbuilt QoS (Quality of Service) and FDIR (Fault Detection, Isolation, and Recovery) capabilities and its backwards compatibility with the SpaceWire technology. SpaceFibre operates at 2.5 Gbits/s and more, providing 12 times the throughput of a SpaceWire link with current flight-qualified technology and allowing data from multiple SpaceWire devices to be concentrated over a single SpaceFibre link. This substantially reduces cable harness mass and simplifies redundancy strategies.

Figure 1:
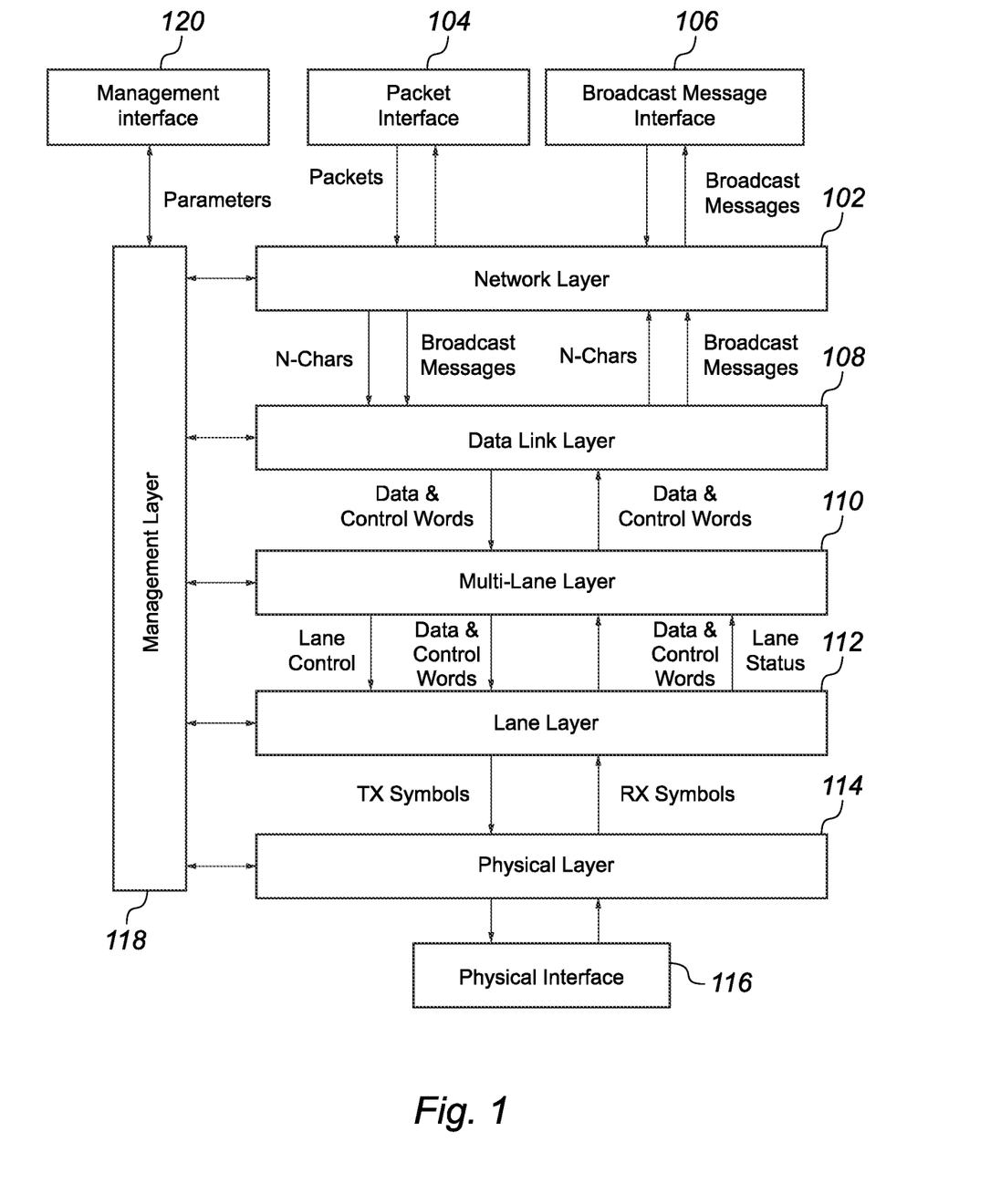
FIG. 1 illustrates the protocol stack for the SpaceFibre multi-lane communication link.

FIG. 1 illustrates the protocol stack for the SpaceFibre multi-lane communication link, as disclosed in Parkes et al, "SpaceFibre: A Multi-Gigabit/s Interconnect for Spacecraft Onboard Data Handling", Aerospace Conference, 2015 IEEE.

The network layer protocol 102 provides two services for transferring application information over a SpaceFibre network; the packet transfer service, via the Packet Interface 104, and the broadcast message service, via the Broadcast Message Interface 106. The packet transfer service transfers SpaceFibre packets over the SpaceFibre network, using the same packet format and routing concepts as SpaceWire. The broadcast message service broadcasts short messages carrying time and synchronisation information to all nodes on the network.

The data link layer 108 provides quality of service and flow control for a SpaceFibre link. It frames the information to be sent over the link to support QoS and scrambles the packet data to reduce electromagnetic emissions. It also provides an error recovery capability; detecting any frames or control words that go missing or arrive containing errors and resending them.

In general, a multi-lane link is a data communication system that transfers data using a logical link consisting of multiple physical lanes.

With reference to FIG. 1, the Multi-Lane Layer 110 is able to operate several SpaceFibre lanes in parallel to provide higher data throughput. It is disclosed in Parkes et al. that in the event of a lane failing the Multi-Lane layer provides support for graceful degradation, automatically spreading the traffic over the remaining working lanes and it does this rapidly without any external intervention. However, how this is achieved is not disclosed therein.

The Lane Layer 112 establishes communications across a SpaceFibre lane, encodes data and control words into symbols, sends and receives symbols over the lane, decodes the received symbols into data and control words, and re-establishes communications across the lane when error occur on a lane. Data is encoded into symbols for transmission using 8B/10B encoding and decoded in the receiver. 8B/10B symbols are DC balanced supporting AC coupling of SpaceFibre interfaces.

The Physical Layer 114 serialises the 8B/10B symbols and sends them over the physical medium via a Physical Interface 116. In the receiver the Physical Layer recovers the clock and data from the serial bit stream, determines the symbol boundaries and recovers the 8B/10B symbols. Both electrical cables and fibre-optic cables are supported by SpaceFibre.

The Management Layer 118 supports the configuration, control and monitoring of all the layers in the SpaceFibre protocol stack via a Management Interface 120.

A problem with conventional approaches in multi-laning is that the number of lanes are fixed after configuration and an arbitrary number of mixed bidirectional and unidirectional lanes is not possible.

Another problem is that, in conventional approaches, fault recovery time is long so any data not sent while the link is recovering from a lane failure cannot be stored in small internal buffers without affecting end user operation.

SUMMARY OF INVENTION

It is desirable for multi-lane data links to dynamically adapt to changes in lane status and configuration. It is desirable for the multi-lane layer in the protocol stack to provide support for graceful degradation, automatically spreading the traffic over the remaining working lanes, rapidly without any external intervention. It is desirable to provide asymmetric multi-lane serial links with fault-tolerant and power-saving capabilities and to allow an arbitrary number of lanes, for example up to a maximum of 16, to be used.

According to a first aspect of the present invention, there is provided a multi-lane communication interface for use in a link having a near end and a far end, the multi-lane communication interface comprising logic, when operating at a near end in cooperation with a far-end multi-lane communication interface, to:

establish symbol synchronisation with the far-end interface over one or more lanes;

send and receive data words to and from the far-end interface while maintaining the symbol synchronisation;

detect a change in lane status; and upon detection of the change in lane status and while maintaining the symbol synchronisation:
(a) stop sending data words;
(b) send near-end lane-status control words to the far end instead of data words, until it is determined that the near end is ready to send data words, then resume sending data words; and
(c) send near-end lane-alignment signals to the far end, until a data word is received from the far end.

Preferably, the multi-lane communication interface comprises logic to detect the change in lane status by receiving a far-end lane-status control word sent from the far-end interface.

Preferably, the multi-lane communication interface further comprises logic to, upon detection of the change in lane status by receiving the far-end lane-status control word sent from the far-end interface, update the active status of a near-end lane accordingly, while leaving the lane status of other lanes unchanged.

Preferably, the multi-lane communication interface comprises logic to update the active status of the near-end lane by disabling a near-end lane that is not active at the far end.

Preferably, the multi-lane communication interface further comprises logic to detect the change in lane status by detecting data errors or configuration changes at the near end, and upon detection of the change in lane status, update the active status of a near-end lane accordingly, while leaving the lane status of other lanes unchanged.

Preferably, the multi-lane communication interface further comprises logic to stop passing received data words to a data link layer of the link while the near-end is not ready to send data words.

Preferably, in step (b), it is determined that the near end is ready to send data words by the logic:
determining near-end lane status at the near-end;
matching to the determined near-end lane status a far-end lane status received in a far-end lane-status control word from the far-end interface; and
determining that all lanes are aligned.

Preferably, whether all lanes are aligned is determined by receiving far-end lane-alignment signals from the far-end interface.

Preferably, the far-end lane-alignment signals received from the far end include information on the lane transmit status at the far end.

Preferably, the multi-lane communication interface further comprises logic to determine that the near end is not ready to send data words if an error is detected in a period of time after it is determined that the near end is ready to send data words, the period of time being the round-trip delay of the link including any processing delay.

Preferably, in step (c) the near-end lane-alignment signals sent to the far end include information on the lane transmit status at the near end.

Preferably, the link has an arbitrary number of physical lanes that comprise both unidirectional and bidirectional lanes.

Preferably, the multi-lane communication interface further comprises logic to detect, for each lane, if the far-end interface has disabled a transmit or receive driver, so a respective lane becomes unidirectional, wherein the multi-lane communication interface is operable to adapt to a dynamic configuration change of the link, using remaining bandwidth of the link.

Preferably, data words that cannot be sent upon detection of the change in lane status and while the near end is not ready to send data words are stored in the multi-lane communication interface, to prevent an external data source from detecting that data words cannot be sent by the multi-lane communication interface.

According to a second aspect of the present invention, there is provided a communication link comprising a multi-lane communication interface according to the first aspect.

According to a third aspect of the present invention, there is provided a method of communication over a multi-lane communication link having a near end and a far end, the method comprising, when performed at a near end in cooperation with a far-end of the link, the steps of:

establishing symbol synchronisation with the far-end interface over one or more lanes;

sending and receiving data words to and from the far-end interface while maintaining the symbol synchronisation;

detecting a change in lane status; and upon detection of the change in lane status and while maintaining the symbol synchronisation:
(a) stopping sending data words;
(b) sending near-end lane-status control words to the far end instead of data words, until it is determined that the near end is ready to send data words, then resuming sending data words; and
(c) sending near-end lane-alignment signals to the far end, until a data word is received from the far end.

Preferably, the step of detecting a change in lane status comprises detecting the change in lane status by receiving a far-end lane-status control word sent from the far-end interface.

Preferably, the method further comprises the step of, upon detection of the change in lane status by receiving the far-end lane-status control word sent from the far-end interface, updating the active status of a near-end lane accordingly, while leaving the lane status of other lanes unchanged.

Preferably, the method comprises the step of updating the active status of the near-end lane by disabling a near-end lane that is not active at the far end.

Preferably, the method further comprises detecting the change in lane status by detecting data errors or configuration changes at the near end, and upon detection of the change in lane status, updating the active status of a near-end lane accordingly, while leaving the lane status of other lanes unchanged.

Preferably, the method further comprises stopping passing received data words to a data link layer of the link while the near-end is not ready to send data words.

Preferably, in step (b), it is determined that the near end is ready to send data words by:
determining near-end lane status at the near-end;
matching to the determined near-end lane status a far-end lane status received in a far-end lane-status control word from the far-end interface; and
determining that all lanes are aligned.

Preferably, whether all lanes are aligned is determined by receiving far-end lane-alignment signals from the far-end interface.

Preferably, the far-end lane-alignment signals received from the far end include information on the lane transmit status at the far end.

Preferably, the method further comprises the step of determining that the near end is not ready to send data words if an error is detected in a period of time after it is determined that the near end is ready to send data words, the period of time being the round-trip delay of the link including any processing delay.

Preferably, in step (c) the near-end lane-alignment signals sent to the far end include information on the lane transmit status at the near end.

Preferably, the multi-lane communication link has an arbitrary number of physical lanes that comprise both unidirectional and bidirectional lanes.

Preferably, the method further comprises detecting, for each lane, if the far-end interface has disabled a transmit or receive driver, so a respective lane becomes unidirectional, wherein the method comprises adapting to a dynamic configuration change of the link, using remaining bandwidth of the link.

Preferably, data words that cannot be sent upon detection of the change in lane status and while the near end is not ready to send data words are stored in a multi-lane communication interface, to prevent an external data source from detecting that data words cannot be sent by the multi-lane communication link.

According to a fourth aspect of the present invention, there is provided non-transitory computer-readable medium containing program code, the program code adapted to configure a circuit or at least one processor of at least one computer to execute the method of the third aspect.

According to a fifth aspect of the present invention, there is provided computer-readable medium containing program code, the program code adapted to configure a circuit or at least one processor of at least one computer to execute the method of the third aspect, the computer-readable medium being selected from the group consisting of a compact disk (CD), a digital video disk (DVD), a flash memory storage device, a hard disk, a random access memory (RAM), and a read only memory (ROM).

BRIEF DESCRIPTION OF DRAWINGS

The present invention is directed to a multi-lane communication interface. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Embodiments of the present invention will now be described, by way of example only, with reference to the drawings, in which.

DESCRIPTION OF EMBODIMENTS

In this description and claims, a multi-lane link is a point to point connection between two devices, which contains at least one bi-directional lane and zero or more uni-directional lanes, and which sends and receives information using one or more active lanes.

Embodiments of the present invention may provide a multi-lane communication interface that allows a multi-lane link with an arbitrary odd or even number of physical lanes (unidirectional or bidirectional) to automatically continue to operate when there are arbitrary changes in the number of transmit and receive lanes due to faults or power saving configuration changes. The multi-lane link is thus able to operate using the lanes that are still available, so if a single lane fails or it is deactivated, it works with all remaining lanes. It can ensure that data is always retrieved in the same order than it was sent, so in-order data integrity is guaranteed even when multiple asynchronous events (faults or lane configuration changes) occur at both ends of the link.

The multi-lane link automatically detects which lanes are no longer available for transmitting or receiving data. The fault recovery time is minimized so any data not yet delivered while the link is recovering from a lane failure can be stored in small internal buffers without affecting end user operation. This prevents an external data source from detecting that data cannot be sent by the multi-lane communication interface.

In embodiments of the present invention, each lane of the multi-lane link may operate independently of other lanes of the same link. Decoding errors in one lane of the link, such as disparity errors in an 8B10B encoding scheme, thus do not affect the status of other lanes of the link, as it happens with other solutions (e.g. PCI Express and Rapid IO).

In embodiments of the present invention, lanes can be activated and deactivated at any time. In conventional approaches, lanes must be initialized together and if the number of operating lanes changes, they all need to be reinitialized.

In embodiments of the present invention, a link can be made up of an arbitrary number of lanes and they can be unidirectional or bidirectional. In conventional approaches (e.g. PCI Express and Rapid IO), the number of lanes must be a multiple of two.

Figure 2:
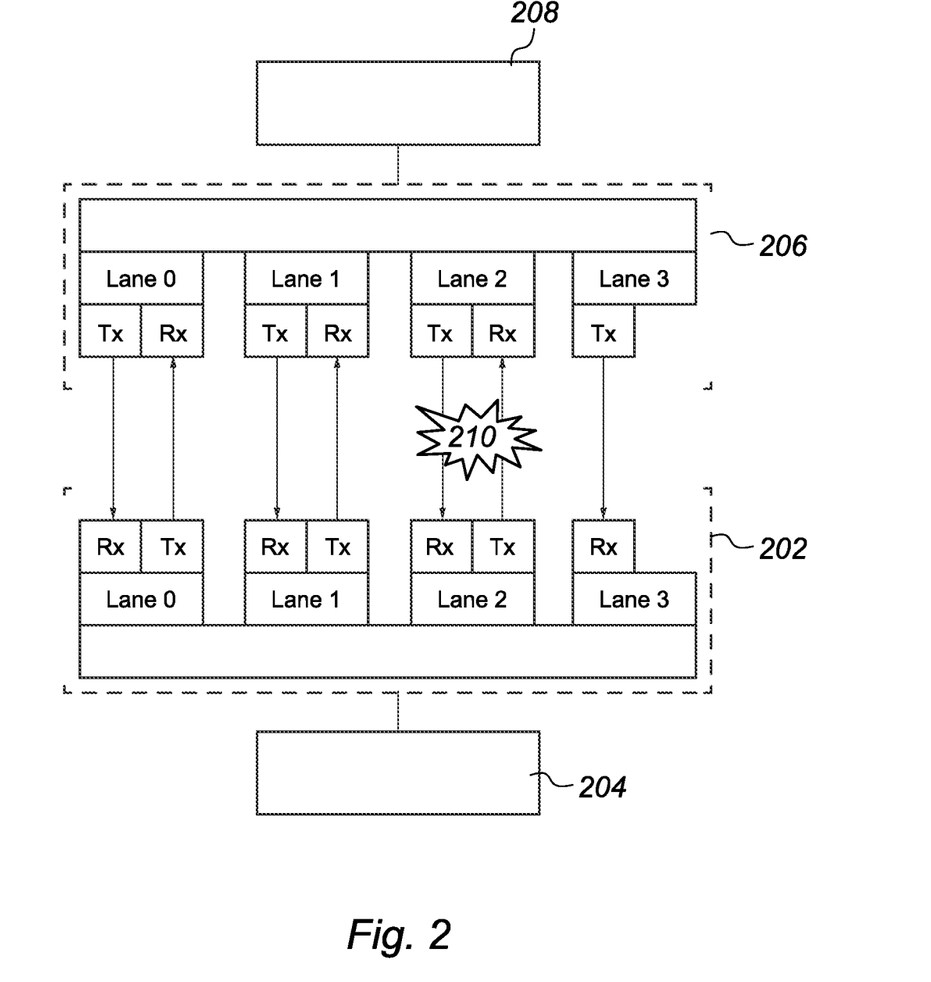
FIG. 2 shows an example of a multi-lane link with four lanes with different configuration and status.

FIG. 2 shows an example of a multi-lane link with four lanes with different configuration and status. The multi-lane link has a near-end multi-lane communication interface 202 connected to a device 204 at the near end of the link. A far-end multi-lane communication interface 206 is connected to a device 208 at the far end of the link.

Lane 0 is a working bidirectional lane. Lane 1 is a bidirectional lane in which the transmitter Tx at the near end has been disabled for power saving reasons, so it is working as a unidirectional lane. Lane 2 is a bidirectional lane that failed due to an error 210 and can no longer be used. Lane 3 can only work as a unidirectional lane as it has only a transmitter Tx at one end of the link and a receiver Rx at the other end.

In conventional approaches such as Rapid IO and PCI Express the lane status are not independent. In such approaches, one end of the link decides a configuration and tries to start all lanes with this configuration. The other end does the same, and both ends receive the information of the configuration that the other end is using. If an end determines that the configuration does not match, it restarts everything again with a new configuration that it is more likely to match the other side. Thus the link is reinitialised by resetting all lanes, not maintaining bit or symbol synchronisation. This system does not support changes in configuration when the system is initializing. Examples of a change of configuration are when a user disables a lane or a lane stops working, as described with reference to FIG. 2.

Figure 3:
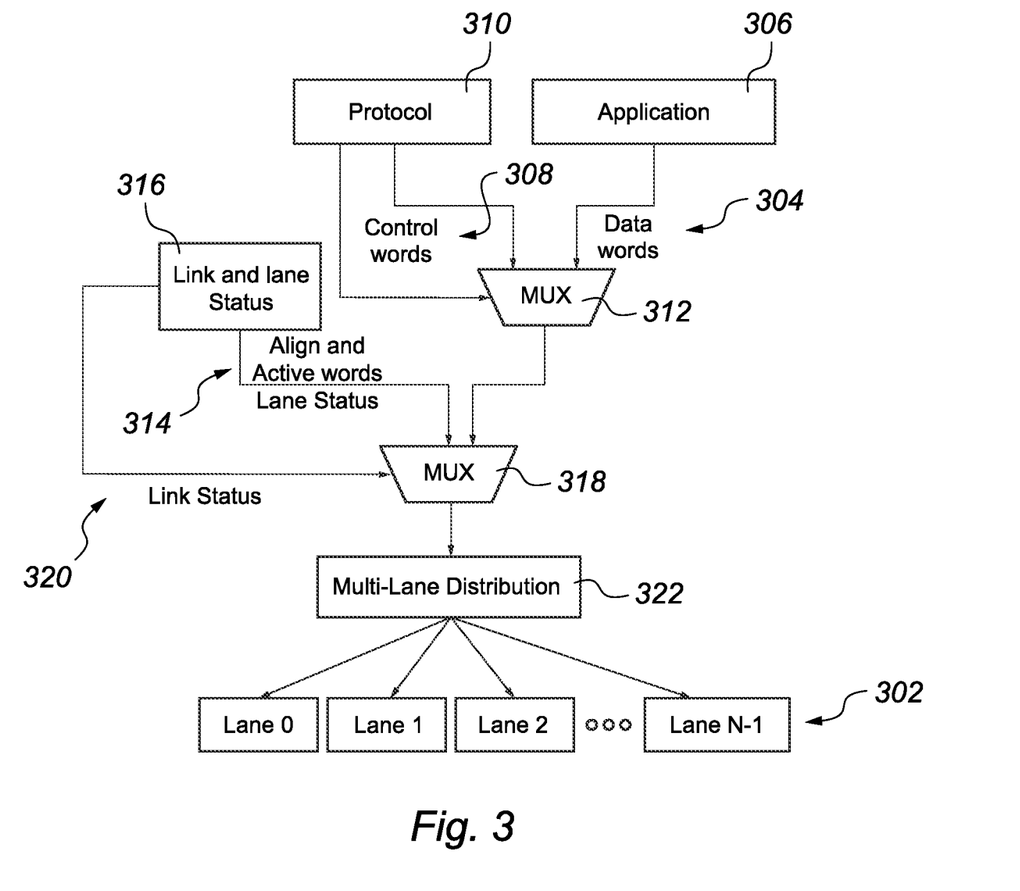
FIG. 3 is a conceptual diagram illustrating the use of each type of word described herein and how they are multiplexed.

FIG. 3 is a conceptual diagram illustrating the use of each type of data unit described herein and how they are multiplexed.

Lanes 302 send information in a multiple of a data unit called a word. Different types of words are now described. Data words 304 are generated by the application 306 and carry user data content. Control words 308 are generated by an arbitrary communication protocol 310. The protocol 310 selects (dotted line) data or control words to be output from the multiplexer 312.

Align and Active words 314 are control words related to the link status and lane status 316. The link status is related to the multi-lane alignment mechanism described with reference to FIG. 5. Align and Active words 314 which convey the status of each lane are selected for output by the multiplexer 318 depending on the link status 320. Align and Active words 314 multiplexed with Data words 304 and other Control words 308 are distributed by multi-lane distribution 322 over the N lanes 302 following the lane ordering defined by the lane numbers 0 . . . N−1.

Figure 4:
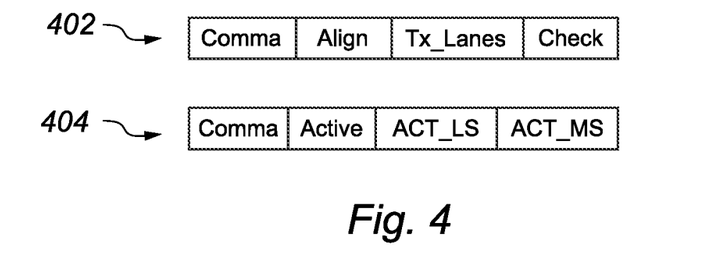
FIG. 4 shows examples of how specific control words can be defined to implement the Align and Active words in accordance with an embodiment of the present invention.

FIG. 4 shows examples of how specific control words can be defined to implement the Align and Active words in accordance with an embodiment of the present invention.

Align word 402 and Active word 404 are shown, each having four symbols. In both words, the first symbol is a comma and the second symbol identifies the type of word, Align or Active.

The third symbol of the Align word 402 contains the current number of lanes used to send words and the lane number of the lane used to send the Align word. The fourth symbol is a checksum value to protect against errors.

The third and the fourth symbols of the Active word 404 indicate which lanes have their lane initialisation state machine in active state. Each bit of these two symbols is associated with the corresponding lane number starting from lane number 0 and up to 15.

Embodiments of the present invention are more robust than conventional approaches because there can be changes in configuration at any time, even when one side of the link is Ready but the other side is Not Ready yet. The effect of using an Align word that contains the number of lanes being used for sending provides a benefit, as alignment check and number of lanes check can be done at the same time.

In an example, each lane of the multi-lane link can be set as a unidirectional receive only lane, a unidirectional transmit only lane, or a bidirectional lane, capable of both transmitting and receiving data. A lane can be enabled or disabled at any time. Each enabled lane can be in the Active state or the Not Active state. A lane in Active state is expected to only receive, only send, or both send and receive data and control words correctly.

A lane may be considered to be in an active state when one or more of the following conditions are fulfilled:
When both ends are ready to send and receive data correctly;
When the lane is set as a unidirectional receive-only lane and it is able to receive data correctly; or
When other lanes of the link receive the information that, at the far end of the link, this lane is in active state.

This enables a unidirectional transmit-only lane to reach the Active state. It also allows to detect when, at the far end, the lane is set as a unidirectional receive-only lane for power saving reasons. In this case, the lane is set as a transmit-only lane if it was previously not set as a such.

A lane in the active state can exit this state when one or more of the following conditions are fulfilled:
When the lane is disabled by the user;
When the lane is set to be able to receive data but the receiver driver indicates that there is not a valid signal, or the measured Bit Error Rate of this lane is too high. The Bit Error Rate can be measured, for example, by counting the number of 8B10B decoding errors;
When the lane receives words indicating that the other end is going to disable the lane because it wants to save power or because it is detecting too many errors and cannot receive data correctly; or
When the lane is set as a unidirectional transmit-only lane and other lanes of the link have received the information that, at the far end of the link, this lane is not in the Active state.

If one lane fails due to errors received on that lane, only that lane status is updated, while leaving the lane status of other lanes unchanged. This is different from other approaches, in which if there are errors in one lane, it causes the whole link to restart all lanes.

A multi-lane link is made up of two or more lanes. Each lane of multi-lane link has a lane number assigned, starting with value 0 up to the N−1 value, where N is the number of lanes that the link has.

At any particular time a link can be considered to be Ready or not Ready to send and receive Data and Control words. When the link is Ready, data words to be transmitted are distributed across the active lanes of the link, on a word-by-word basis, following the same order of the lane number. Control words may also be distributed across the active lanes in the same way, or the same control word may be copied and sent across all active lanes simultaneously. Also, only when the link is ready, data words and control words can be received from all active lanes of the link, on a word-by-word basis, following the same order of the lane number assignment.

When the link is considered to be Not Ready, the link is not allowed to send and receive data words.

After power up, a link is initially considered to be Not Ready. When the link is Not Ready, it sends words providing the information of which lanes of the link, identified by their lane number, are in the active state. These words, called in this example Active words, are not sent when the link is Ready, so they are also used to indicate to the far end that the link is Not Ready. Active control words are used to signal to the far end of a link which lanes are Active. An Active control word is valid if it is the same as the previously received Active control word.

Each lane of the link can have a different skew, so words received by each lane are aligned to have the effect that words are processed in the same order that they were sent.

To help with the alignment process, a specific word, called in this example Align word, is sent simultaneously over all active lanes, periodically, with a period longer than the worst case skew between lanes. The Align word is sent when the link is Not Ready or when the far end of the link is Not Ready, as indicated by the reception of Active words. The Align word carries the information of the number of lanes being used to transmit data, i.e. the number of lanes that are active and able to send data and control words at the end of the link that sends the Align word. Each Align word may also carry the lane number of the lane that sent that Align word. Align control words are used to align a row across the active lanes. Align control words are sent by each end of a multi-lane link to signal to the other end of the link which lanes are active sending lanes. When a link needs to realign its lanes it repeatedly sends Active control words interspersed periodically by Align control words, until all the lanes in the link are aligned.

Figure 5:
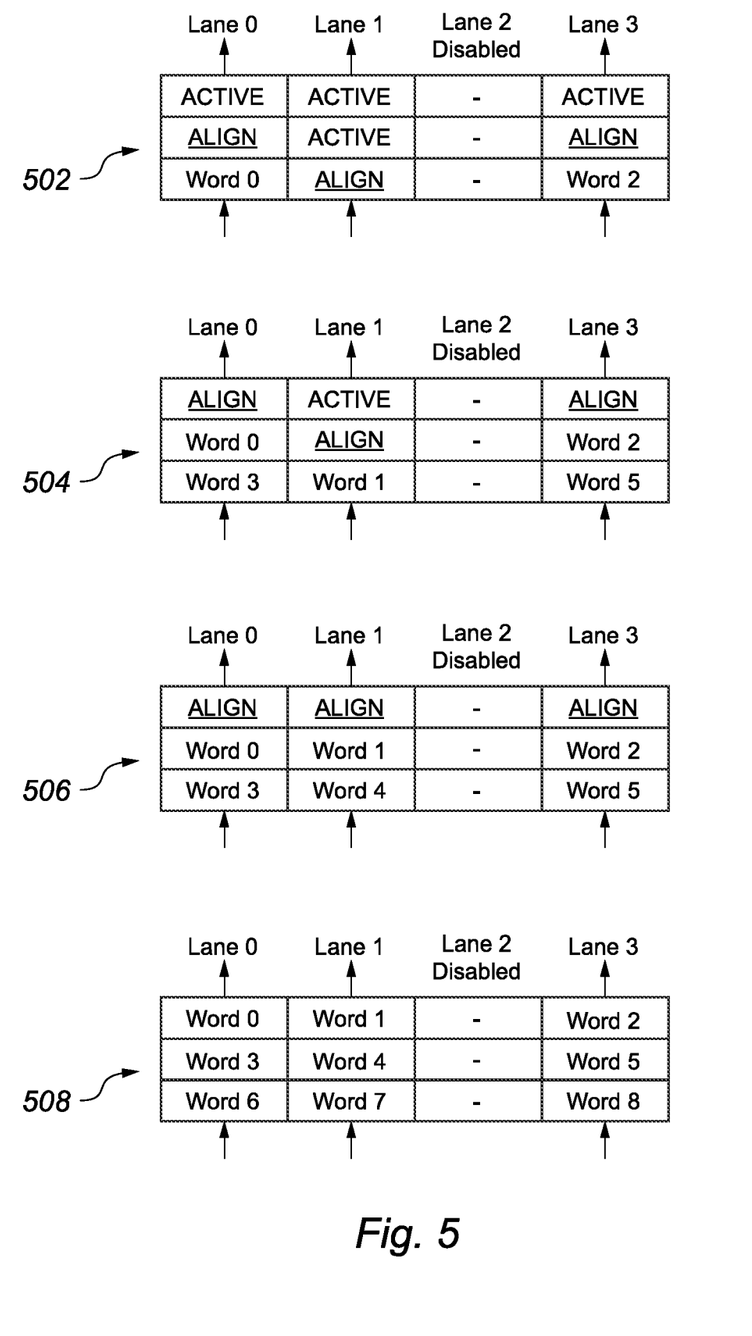
FIG. 5 illustrates the alignment of words received from several lanes.

FIG. 5 illustrates the alignment of words from several lanes.

At step 502: Realignment is necessary so seven ACTIVE words are sent followed by a ALIGN word on all lanes. Lanes are not aligned so one ALIGN word is received out of step with the others. All lanes are read.

At step 504: ALIGN word are sent on all lanes after seven ACTIVE words.

Lane 0 and Lane 3 are not read because they contain ALIGN but not all lanes contain ALIGN.

At step 506: All lanes have ALIGN at output, so all lanes are read. The subsequent words (Word 0 to Word 5) would in fact be further ACTIVE control words, until alignment signalled to other end of the link. These words are numbered for clarity.

At step 508: Aligned data is read from all lanes.

Lane Alignment ensures that each of the active lanes of a link are correctly aligned so that when information is read from the lanes the words of a complete row are read together. Slight differences in delay through the various lanes of a link could result in one lane having its word in a row available slightly earlier or later than words in the same row from other lanes. This could result in the wrong data being read for a row. Row alignment ensures that the delay differences are compensated and that all the words of a row are lined up ready to be read together. After alignment the first row read contains the first set of N words received, the next row the next set of N words, and so on.

To perform row alignment an alignment FIFO is provided for each lane. Each alignment FIFO is able to store sufficient data or control words to allow alignment of a received row. When a data or control word arrives from the lane layer, it is placed in the alignment FIFO for that lane. When the next word to be read out of the alignment FIFO is a valid Align control word, it is only read from the alignment FIFO, when the next word to be read from all the active lanes is a valid Align control word, a valid Align control word being one that is not in error. When the next word to be read is a data word or a control word other than the Align control word, that word is read from the alignment FIFO. When the next word to be read from the alignment FIFO of every active lane, is a valid Align control word, the row is fully aligned and all the Align control words are read out of the alignment FIFO simultaneously.

When the row is fully aligned and the Align control words have been read, each following row contains aligned data and control words and each row is read, until a misalignment condition occurs and alignment needs to be done once more.

If one alignment FIFO is full when a word has to be placed in it, all alignment FIFOs are flushed. This can occur when an Align word was lost.

Figure 6:
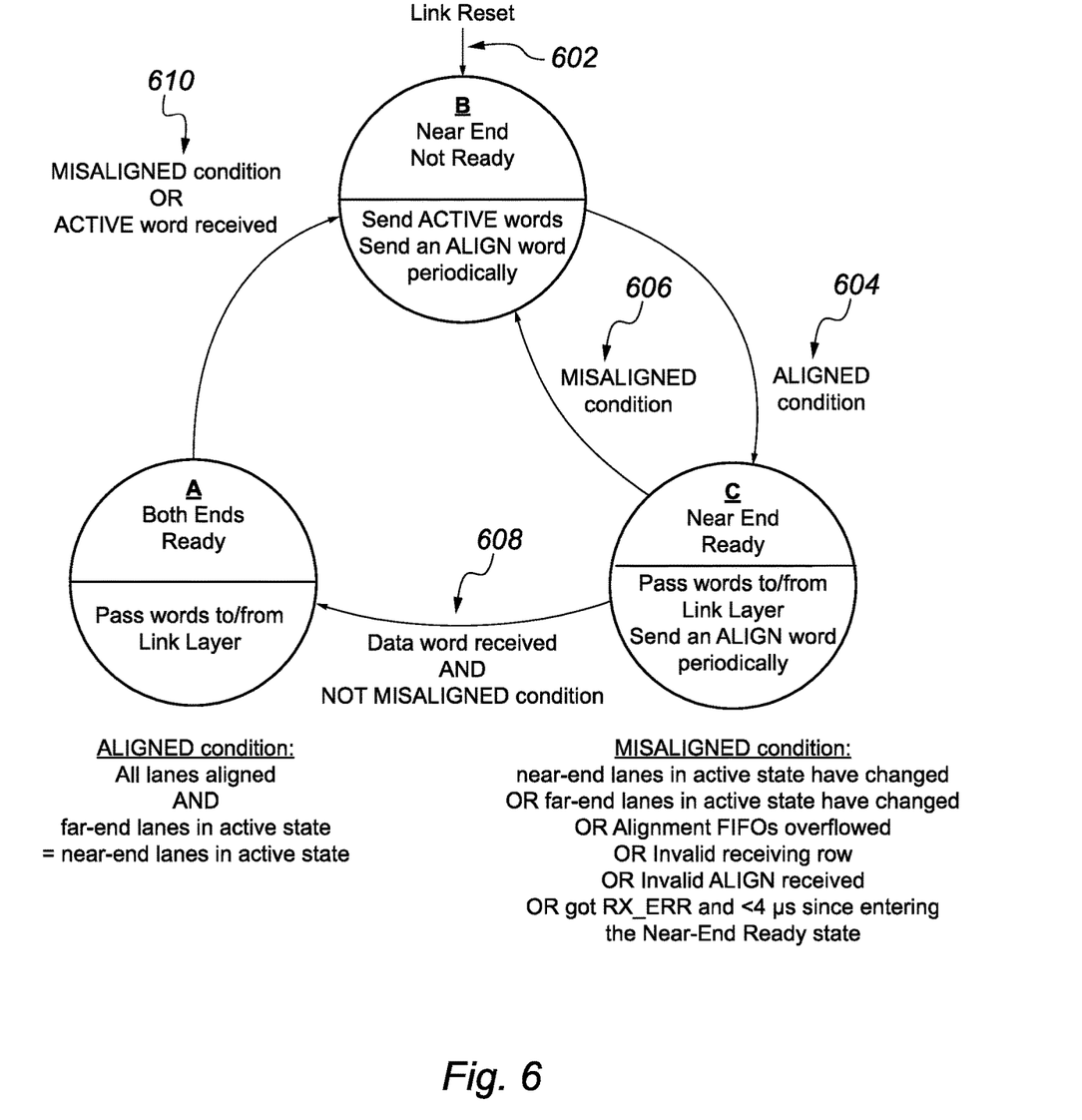
FIG. 6 is a link state diagram of a multi-lane communication interface in accordance with an embodiment of the present invention.

FIG. 6 is the state diagram of a state machine that illustrates the behaviour of a multi-lane communication interface in accordance with an embodiment of the present invention.

A multi-lane communication interface is used in both ends of a multi-lane link with the two ends of the link being referred to as a near end and a far end. In the following example, the multi-lane communication interface operates at a near end in cooperation with a far-end multi-lane communication interface. In that case, the far-end multi-lane communication interface may operate in the same way as the near-end multi-lane communication interface.

The multi-lane communication interface has logic to initialise the link and establish symbol synchronisation with the far-end interface. This logic is controlled by an alignment state machine, which is illustrated in FIG. 6 and which may be implemented in logic comprising software or and/or logic circuitry.

Upon reset 602 of the link the alignment state machine enters the Not-Ready state B. Symbol synchronisation is established with the far-end interface.

In the Not-Ready state B the lanes of the link are not yet aligned so data words cannot be sent or received. To align the lanes the alignment state machine commands multi-lane logic to send Active control words over each lane of the link and to periodically to send Align control words, for example one Align word every seven Active words.

When Align and Active control words are received they contain information about which lanes at the far end of the link are active. This can be compared to the state of the lanes in the near end of the link and when they match up the near end will be ready to start sending data words. The alignment FIFOs will receive the Active and Align control words over each of the active lanes and align them. Once row alignment has been achieved and the far-end state information contained in the Active and Align control words agrees with near-end state information, the lanes are Aligned 604 and the alignment state machine can move to the Near-End-Ready state C.

For the lanes to be Aligned 604, all of the following conditions are fulfilled:

The Lane alignment process that compensates the skew between lanes is complete, so the near end of the link receives words from the active lanes in the same order that they were sent by the far end. This condition is verified by the simultaneous reception of the Align word by all active lanes. When the link is already in Ready state, this can also be verified by the reception of control words that are sent simultaneously by all lanes.

The number of lanes used for sending data at the far end of the link, as indicated by the last received Align word, matches the number of lanes being used to receive data.

The lane number assigned at both ends of each lane is the same. This is verified by the content of the Align word or the content of other words being sent when the lane is Not Ready.

The lanes that are active are the same at both ends of the link. This is verified by the reception of Active words.

In the Near-End-Ready state C, the alignment state machine instructs the multi-lane logic to stop sending Active control words and enables it to send and receive data words, while maintaining the symbol synchronisation. Align words are still sent periodically, to ensure that the alignment process at the far end of the link completes, while still maintaining the symbol synchronisation.

Misalignment of the row of lanes can occur for any one of several reasons:
- The lanes in the near end of the link that are in the active state could change, i.e. an active lane could cease to be active or a lane that was not active could become active;
- The lanes in the far end of the link that are in the active state could change and this would be indicated in the Active control words;
- The alignment FIFOs could overflow;
- The receiving row could be invalid, containing a mix of control and data words in the same row;
- An Align control word could be received containing an error; or
- A control or data word could be received containing an error within a short period of time after entering the Near-End-Ready state. This error would have been travelling on the line between the two ends of the link when row alignment was detected. This check ensures that both sides do not end in an inconsistent state due to errors in one or multiple lanes. The interface has logic to determine that the near end is not ready to send data words if an error is detected in a period of time after it is determined that the near end is ready to send data words. The period of time is the round-trip delay of the link including any processing delay. It is preferably less than 4 microseconds. The period of time is the result of the worst case sum of the time to transmit a word, plus the delay until it reaches the far end, plus the processing of this word in the far end, plus the delay of a word created at the far-end until it reaches the near end. After this period of time the near-end interface can receive information from the far end that is aware and up-to-date of the near end's current status, if this had not changed since the period of time started. For the protocol to be robust the near end cannot get receive errors until the period of time has elapsed since the link became ready.

In the Near-End-Ready state C, when a misalignment condition occurs 606, the alignment state machine moves back to the Not-Ready state B. Thus, in the case of changes detected via received Active control words, the near-end interface can detect a change in the lane status by receiving far-end lane-status data sent from the far-end interface. When in the Not-Ready state B, the alignment state machine will then take the multi-lane logic through the steps needed to achieve correct row alignment.

In the Near-End-Ready state C, when a data word is received and no misalignment has occurred 608, the alignment state machine moves to the Both-Ends-Ready state, A. The alignment state machine instructs the multi-lane logic to not send Active and Align control words and to send and receive data and other data link layer control words. In the Both-Ends-Ready state A, both ends of the multi-lane link are fully aligned and able to transfer data using the lanes that are active.

If, when the alignment state machine is in the Both-Ends-Ready state A, a misalignment condition occurs or an Active word is received 610, indicating a change in the active lanes (i.e. lane status) at the far end of the link, the alignment state machine moves to the Near-End-Not-Ready state B and starts the process of lane alignment once again. Thus, again, the near-end interface can detect a change in the lane status by receiving far-end lane-status data sent from the far-end interface.

Thus, upon detection of the change in lane status, the logic:
(a) stops sending data words while maintaining the symbol synchronisation;
(b) sends near-end lane-status control words (Active words) to the far end instead of data words while maintaining the symbol synchronisation, until it is determined that the near end is ready to send data words, then resumes sending data words while maintaining the symbol synchronisation; and
(c) sends near-end lane-alignment signals (Align words) to the far end while maintaining the symbol synchronisation, until a data word is received from the far end.

Use of the multi-lane communication interface enables a link that continuously monitors which lanes are active and ready to send data, in each end of the link, to dynamically react to changes in their configuration and status, without requiring the complete initialisation of all the system. When the link detects that the status of one or more lanes change from Active to Not Active or Not Active to Active, due to a fault occurring or a power saving configuration change, the link immediately stops sending user data, and starts sending the status information of each lane (i.e. a transition from states A to B), while maintaining symbol synchronisation. This prevents the far end of the link from processing user data when there is an invalid lane ordering, and allows the far end to verify that the lanes being used for receiving data at the near end are the same ones the far end used for sending this data. If there is a mismatch detected at the far end by the reception of this status information, the far end also stops sending user data and sends instead the status information of each of its lanes. The link can resume sending data as soon as it is verified that the status of each lane is the same at both ends of the link and the lanes are aligned so that different skew between each lane is compensated.

Soon after the fault or new lane configuration has been detected, the lane status of the far end of the link will once again match that of the near end. In case of a bidirectional lane, a lane can detect by itself if the far end has entered or exited the Active state. In case of unidirectional transmit only lane, the lane is informed by the link when the far end has entered or exited the active state, so it can modify its own status accordingly. This is done through at least one bi-directional lane that is present in the link.

The Align word is used for detecting and compensating for different lane skew also includes the information of how many lanes are active and ready to send data. A link can resume sending user data when this control word is received and its content is validated, i.e. the indicated number of lanes used for sending is equal to the lanes currently used for receiving. This control word is sent periodically when either end of the link becomes Not Ready. This allows both ends of the link to resume operation even when there are arbitrary errors on one or multiple lanes resulting in the loss of information transferred.

Figure 7:
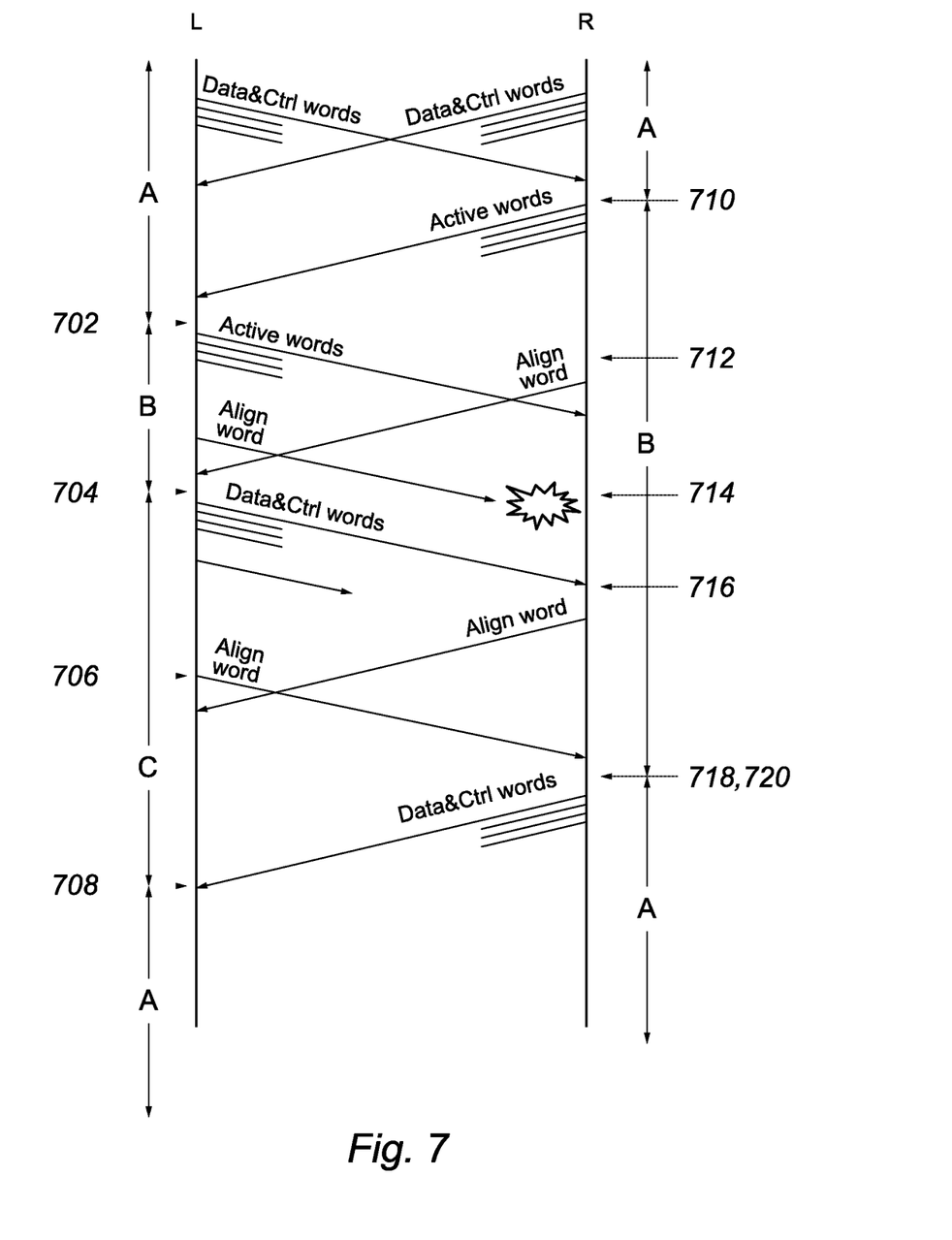
FIG. 7 shows an example of how the multi-lane communication interface operates when a unidirectional receive only lane is disabled due to an error or power saving setting or other configuration change.

FIG. 7 shows an example of how the multi-lane communication interface operates when a unidirectional receive-only lane is disabled due to an error or power saving setting. In this example, at the left-end of the link, labelled L, this lane is a unidirectional transmit-only lane, so the left-end has no means to detect that the right-end, labelled R, is being disabled. Using the Active words, the approach ensures that the transmit-only lane is disabled and both ends agree on the number of lanes being used. Even if there are additional errors or configuration changes in one or more lanes, data integrity related with lane ordering is guaranteed.

Two ends of the link are shown each with their own multi-lane communication interface in accordance with an embodiment of the present invention. The time axis is from top to bottom.

Considering the left-end, L, with the left-end interface starting in the "Both Ends Ready" state A:

At step 702:
Active words are received with one of the lanes in a different state.
The Tx only lane is notified that the other end is not in active state, so it also exits the active state.
The left-end interface moves to the "Near-End-Not-Ready" state B.

At step 704:
An Align word is received with its number of lanes used for sending field equal to the number of lanes used for receiving at the near end (left end).
All other conditions required for the left-end interface to move to the Ready state are fulfilled.
The left-end interface moves to the "Near-End-Ready" state C.

At step 706:
The left-end sends Align words periodically, interleaved between data and control words, because Active words are being received, indicating that the other side of the link (right-end) is in the Not-Ready state B.

At step 708:
A Data word is received, indicating that the other end of the link (right-end) has reached the Near-End-Ready state C, so that both ends are now ready.
The left-end interface moves to the "Both Ends Link Ready" state A.

Considering the right-end, R, with the right-end interface starting in the "Both Ends Link Ready" state A:

At step 710:
A receive-only lane detects too many errors and it is disabled.
The number of lanes in the active state changes, accordingly.
The right-end interface moves to the "Near-End-Not-Ready" state B.
Data words received subsequently are discarded.

At step 712:
Data words are discarded as the right-end of the link is still in the Not-Ready state.
Align words are sent periodically, interleaved between Active words, because the right-end of the link is in the Not-Ready state.

At step 714:
An error occurs and an Align word is not received.

At step 716:
Data words are discarded as the link is still in the Not-Ready state.

At step 718:
An Align word is received with its number of lanes used for sending field equal to the number of lanes used for receiving at the near end (right end).
All other conditions required for the right-end interface to move to the Ready state are fulfilled.
The right-end interface moves to the "Near-End-Ready" state C.

At step 720:
A data word is received indicating that the other end of the link (left-end) is in the Near-End-Ready state C, so both ends of the link are now ready.
The right-end interface moves to the "Both Ends Link Ready" state A.

Advantages provided by one or more embodiments of the present invention are as follows:

The multi-lane link can operate with an arbitrary number of unidirectional (transmit or receive) and bidirectional lanes. The total bandwidth available is the sum of the individual bandwidth of each lane, without accounting for protocol overheads.

The link automatically detects the number of transmit and receive lanes being used at the far end of the link and whether they are unidirectional or bidirectional.

The lanes of the link have inherent "hot-plug" capabilities as their status can be changed at any time.

Each lane of the link can be configured independently without constraining other lanes.

If a lane fails or it is disabled it does not affect the operation of other lanes.

Port width (size of the interface with the application) is independent of link width (number of lanes).

In-order data delivery, which might be compromised by the data distribution over multiple lanes, is guaranteed even in the event of any number of words being lost due to errors in one or multiple lanes, or in the event of multiple asynchronous changes in lane configuration and status at each end of the link. The receiver detects that the lane ordering at the far end has changed before processing data with incorrect lane ordering. When there is a change in the status or configuration of one lane, the system can resume data transfer with the remaining lanes, without waiting for a timeout timer to expire or for a lane to be reinitialised.

It is apparent to one of ordinary skill in the art that the innovative multi-lane communication interface is, at least in some embodiments, implemented by logic comprising software code and/or logic circuitry to carry out various steps of the present invention's logic as described above. The logic circuitry may comprise a computer chip designed with VHDL (VHSIC Hardware Description Language) code. Moreover, the software code or the code necessary to design such computer chip can of course be stored in and/or read from any computer-readable medium, such as a compact disk (CD), a digital video disk (DVD), a flash memory storage device, a hard disk, a random access memory (RAM), or a read only memory (ROM), as well as numerous other computer-readable media not specifically mentioned in this application.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. A multi-lane communication interface for use in a multi-lane link made up of two or more lanes and having a near end and a far end, the multi-lane communication interface comprising logic, when operating at a near end in cooperation with a far-end multi-lane communication interface, to:
  establish symbol synchronisation with the far-end interface over one or more lanes;
  send and receive data words to and from the far-end interface while maintaining the symbol synchronisation;
  detect a change in lane status; and
  upon detection of the change in lane status and while maintaining the symbol synchronisation:
  (a) stop sending data words;
  (b) send near-end lane-status control words to the far end instead of data words, until it is determined that the near end is ready to send data words, then resume sending data words; and
  (c) send near-end lane-alignment signals to the far end, until a data word is received from the far end,
  wherein it is determined that the near end is ready to send data words by the logic:
  (b1) determining that all lanes are aligned by receiving far-end lane-alignment signals from the far-end interface;
  (b2) validating that a number of lanes used by the far end for sending, indicated by information on lane transmit status included in a far-end lane-alignment signal received from the far-end, is equal to a number of lanes currently used by the near end for receiving; and
  (b3) determining near-end lane status at the near-end and matching to the determined near-end lane status a far-end lane status received in a far-end lane-status control word from the far-end interface.

2. The multi-lane communication interface of claim 1, comprising logic to detect the change in lane status by receiving a far-end lane-status control word sent from the far-end interface.

3. The multi-lane communication interface of claim 2, further comprising logic to, upon detection of the change in lane status by receiving the far-end lane-status control word sent from the far-end interface, update the active status of a near-end lane accordingly, while leaving the lane status of other lanes unchanged.

4. The multi-lane communication interface of claim 3, comprising logic to update the active status of the near-end lane by disabling a near-end lane that is not active at the far end.

5. The multi-lane communication interface of claim 1, further comprising logic to detect the change in lane status by detecting data errors or configuration changes at the near end, and upon detection of the change in lane status, update the active status of a near-end lane accordingly, while leaving the lane status of other lanes unchanged.

6. The multi-lane communication interface of claim 1, further comprising logic to stop passing received data words to a data link layer of the link while the near-end is not ready to send data words.

7. The multi-lane communication interface of claim 1, wherein:
  (b1) determining that all lanes are aligned; and
  (b2) validating that the number of lanes used by the far end for sending is equal to the number of lanes currently used by the near end for receiving,
  are done at the same time.

8. The multi-lane communication interface of claim 1, further comprising logic to determine that the near end is not ready to send data words if an error is detected in a period of time after it is determined that the near end is ready to send data words, the period of time being the round-trip delay of the link including any processing delay.

9. The multi-lane communication interface of claim 1, wherein in step (c) the near-end lane-alignment signals sent to the far end include information on the lane transmit status at the near end.

10. The multi-lane communication interface of claim 1, in which the link has an arbitrary number of physical lanes that comprise both unidirectional and bidirectional lanes which can operate and be configured independently of other lanes in the link.

11. The multi-lane communication interface of claim 1, further comprising logic to detect, for each lane, if the far-end interface has disabled a transmit or receive driver, so a respective lane becomes unidirectional, wherein the multi-lane communication interface is operable to adapt to a dynamic configuration change of the link, using remaining bandwidth of the link.

12. A communication link comprising the multi-lane communication interface according to claim 1.

13. A method of communication over a multi-lane communication link made up of two or more lanes and having a near end and a far end, the method comprising, when performed at a near end in cooperation with a far-end of the link, the steps of:
  establishing symbol synchronisation with the far-end interface over one or more lanes;
  sending and receiving data words to and from the far-end interface while maintaining the symbol synchronisation;
  detecting a change in lane status; and
  upon detection of the change in lane status and while maintaining the symbol synchronisation:
  (a) stopping sending data words;
  (b) sending near-end lane-status control words to the far end instead of data words, until it is determined that the near end is ready to send data words, then resuming sending data words; and
  (c) sending near-end lane-alignment signals to the far end, until a data word is received from the far end,
  wherein it is determined that the near end is ready to send data words by:
  (b1) determining that all lanes are aligned by receiving far-end lane-alignment signals from the far-end interface;
  (b2) validating that a number of lanes used by the far end for sending, indicated by information on lane transmit status included in a far-end lane-alignment signal received from the far-end, is equal to a number of lanes currently used by the near end for receiving; and
  (b3) determining near-end lane status at the near-end and matching to the determined near-end lane status a far-end lane status received in a far-end lane-status control word from the far-end interface.

14. The method of communication of claim 13, wherein the step of detecting a change in lane status comprises detecting the change in lane status by receiving a far-end lane-status control word sent from the far-end interface.

15. The method of communication of claim 13, further comprising detecting the change in lane status by detecting data errors or configuration changes at the near end, and upon detection of the change in lane status, updating the active status of a near-end lane accordingly, while leaving the lane status of other lanes unchanged.

16. The method of communication of claim 13, wherein:
(b1) determining that all lanes are aligned; and
(b2) validating that the number of lanes used by the far end for sending is equal to the number of lanes currently used by the near end for receiving, are done at the same time.

17. The method of communication of claim 13, further comprising the step of determining that the near end is not ready to send data words if an error is detected in a period of time after it is determined that the near end is ready to send data words, the period of time being the round-trip delay of the link including any processing delay.

18. The method of communication of claim 13, further comprising detecting, for each lane, if the far-end interface has disabled a transmit or receive driver, so a respective lane becomes unidirectional, wherein the method comprises adapting to a dynamic configuration change of the link, using remaining bandwidth of the link.

\* \* \* \* \*